United States Patent [19]
Ter Horst

[11] Patent Number: 4,921,088
[45] Date of Patent: May 1, 1990

[54] DEVICE FOR FORMING A BATCH CONSISTING OF A PREDETERMINED NUMBER OF DISCS

[75] Inventor: Gerrit H. F. Ter Horst, Schalkhaar, Netherlands

[73] Assignee: Thomassen & Drijver-Verblifa N.V., Netherlands

[21] Appl. No.: 90,928

[22] Filed: Aug. 31, 1987

[30] Foreign Application Priority Data

Jan. 26, 1987 [NL] Netherlands ......................... 8700181

[51] Int. Cl.[5] ............................................... B65G 47/26

[52] U.S. Cl. .............................. 198/418.7; 198/419.1; 198/503

[58] Field of Search ...................... 198/425, 503, 418.7, 198/419.1, 419.2, 419.3; 414/330

[56] References Cited

U.S. PATENT DOCUMENTS

| | | | |
|---|---|---|---|
| 4,038,909 | 8/1977 | Preisig | 198/503 X |
| 4,298,118 | 11/1981 | Cottrell | 198/503 X |
| 4,552,261 | 11/1985 | Raudat et al. | 198/419.3 |
| 4,610,346 | 9/1986 | Phillipson | 414/330 X |
| 4,611,705 | 9/1986 | Fluck | 198/419.3 X |
| 4,625,499 | 12/1986 | Yamaguchi et al. | 198/419.1 X |
| 4,669,600 | 6/1987 | Fluck | 198/416 X |

FOREIGN PATENT DOCUMENTS

| | | | |
|---|---|---|---|
| 111432 | 6/1984 | European Pat. Off. | 414/330 |
| 1511816 | 11/1969 | Fed. Rep. of Germany . | |
| 3333521 | 6/1986 | Fed. Rep. of Germany . | |
| 2107683 | 5/1983 | United Kingdom . | |
| 2121011 | 12/1983 | United Kingdom . | |

*Primary Examiner*—Frank E. Werner
*Assistant Examiner*—Cheryl L. Gastineau
*Attorney, Agent, or Firm*—Watson, Cole, Grindle & Watson

[57] ABSTRACT

A device for forming from a batch consisting of an undetermined number of more or less disc-like objects, such as metal covers, of a part batch consisting of a pre-selected number of objects, which device comprises a conveyor chute for supplying the batch of objects and for carrying them past a counting device for counting the passing objects and a separating device for separating off the batch when a pre-selected number of objects has been counted.

13 Claims, 4 Drawing Sheets

DEVICE FOR FORMING A BATCH CONSISTING OF A PREDETERMINED NUMBER OF DISCS

The invention relates to a device for forming from a batch consisting of an undetermined number of more or less disc-like objects, such as metal covers, of a part batch consisting of a pre-selected number of objects, which device comprises:

a conveyor chute extending at least substantially horizontally for supplying said batch of objects and for carrying them past, a counting device for counting the passing objects from the foremost object of said batch; and a separating device separating off from the said batch, when a pre-selected number of objects has been reached, a part batch consisting of that counted, pre-selected number of objects.

Covers have long been counted mechanically. The actual counting took place in a counter wheel constructed more or less as a toothed wheel, whereby a disc fits into each tooth space. The correct counted number was regulated via a gear unit. Having reached the required counted number, the counter stopped, following which a space had to be made manually in the batch of supplied objects, after which the separated part batch could be dealt with further, for example packaged or otherwise processed.

This known mechanism had a comparatively large tolerance of ± two objects, since the apparatus is not capable of overcoming product variations. Because the objects handled, for example aluminium easy-opening covers, are expensive and the numbers of objects to be processed are extremely large, a search was made for better solutions.

Known from DE-A-No. 33 33 521 is a device of the type referred to in the preamble. This device counts the covers mechanically, interrupts the progress of the batch when the required number has been reached, moves the counted part batch (over a distance of approximately 140 mm), thereby providing a member of staff or a machine with the opportunity to come into the space between the remainder of the batch and the part batch in order to be able to further process the part batch.

The counting device of this known device is based on a counter wheel on which counter blades are mounted at a regular angular distance from one another, which protrude when the wheel is rotated between each passing cover. One revolution of the counter wheel corresponds to the number required.

When after one revolution of the counter wheel the relevant number has been reached, a mechanical coupling is brought about for a short time between the counter wheel with the blades and the separating mechanism. This separating mechanism comprises separating blades which rise upward into the space which the counter blade has made in the batch. The separation is always made precisely after the last counted object, irrespective of the transport speed of the batch.

Relative to the older techniques this known device has a number of advantages:

a relatively reliable count is made at high speeds;

the accuracy of the count is considerably improved; and counting and spacing are performed in one device.

This known device does however also display a number of drawbacks.

Should a different number of disc-like objects be desired in a part batch, then another counter wheel will have to be used, which requires a mechanically time-consuming operation on the device, while a counter wheel is moreover costly.

As a result of the construction of the counting wheel the counted number can only ever be a multiple of 8, 9, 10 or 11.

If a counting wheel is made with a space for eight covers between two successive counter blades, it can occur that, because of dimensional tolerances of the covers, these eight covers will for example no longer fit between the blades. Such problems also occur as a result of resilient compression against one another of covers supplied under pressure.

Because the counter blades and the separating blades grip on the bottom of the transported disc-like objects it occurs that the first or last object, which is therefore not supported on one side, falls over.

The invention has for its object to now provide a device which is capable of counting passing objects with great reliability and at great speed irrespective of dimensional tolerances or resilient compression of the passing objects.

The invention has the further purpose of giving such a device a form such that it is considerably cheaper than the known device and moreover displays a considerably greater flexibility, and can in particular be adapted easily for forming of part batches consisting of other, and even random, numbers of objects.

In order to realize these objectives the invention provides generally a device of the type referred to in the preamble which has the feature that the counting device is arranged for counting the objects one by one, the separating device comprises a separating member having a separating edge, extending transversely of the longitudinal direction of said batch, which separating member is carried by an electrically controllable displacement member, which displacement member is arranged and positioned relative to said conveyor chute such that when said separating member with its separating edge receives an actuating signal it is carried over some distance between two objects in said batch; and a central control unit for receiving the output signal from the counting device corresponding to the counted number of objects, a memory for storage of said pre-selected number and delivery of the actuation signal to the separating device.

In order to achieve a position separation between the remainder of the batch and the formed part batch a variant can be advantageously employed in which the separating edge possesses a wedge shape.

In order to be able to make the desired separation at great speed an embodiment can be used in which the displacement member is a pneumatic cylinder that can be electrically actuated.

An extremely high separation speed can be obtained with a variant of the latter which has the feature that the actuating signal is a voltage, the peak value of which is at least twice as great as the nominal peak value of an actuating signal for the pneumatic cylinder.

Use is preferably made of conveyor means for further conveying the part batch, after actuation of the separating device, over a certain distance in the line of the batch and under the control of the central control unit.

In a very simple embodiment the conveyor means can in this case be arranged for displacing the separating member over the said distance in the direction in line with the batch.

This embodiment can have the drawback that the applied force of displacement grips onto the part batch such that the rearmost objects display a tendency to tip over.

Use if therefore preferably made of an embodiment in which the conveyor means comprise two transport fingers positioned symmetrically relative to the separating member, which transport fingers can together be carried by second displacing means over some distance between the two objects separated by said separating member and which are then displaced over the said distance while pushing on the part batch of objects, this under the control of the central control unit.

In their inactive position the transport fingers are situated in the same vertical plane as the separating member. In this case the detection of the last cover takes place virtually simultaneously with the separation and the start of the further transportation. This avoids having to include speed dependent intervals between the various processes, which would involve complication of the central control unit. The last proposed embodiment does however involve the necessity of a very rapid separating action. This is however no problem according to the invention when use is made of a pneumatic cylinder actuated by overvoltage, as explained above.

In a practical embodiment the conveyor means comprise a guide extending in the longitudinal direction of the chute, past which guide a reciprocating carriage carrying the transport fingers can be moved.

In this case an embodiment can be used in which the carriage also bears the displacement member with the separating member.

A very simple and reliable embodiment is that which displays the feature that the guide is coupled to a pivot member such that said guide can pivot, and that a second displacement member is present to make said guide pivot with the carriage.

It is essential according to the invention that use be made of an individual count, that is, a one by one count of the objects passing the counting device.

A very reliable count is achieved with an embodiment in which the counting device comprises:

a source for radiation, means for directing this radiation onto the edge in the plane of the objects passing the separating strip, and a detection device for detecting reflected radiation, this detection device being connected to the central control unit for feeding count signals to same.

In order to exclude any risk when objects are being handled of the detection means receiving radiation from an object lying outside the nominal plane, the embodiment can serve in which the direction of the radiation has a component substantially in the direction of displacement of the objects and a component substantially perpendicular to the peripheral edge at the location of the strike point of the radiation on that edge, and that the detection device is arranged and positioned for observing radiation reflected in the direction of the radiation source.

Very reliable and positive transporting is ensured with a device provided with means gripping the objects during transport at approximately the level of their mass centre while applying friction on either side. In this embodiment the first or last object of a batch is positively prevented from falling over.

The invention will now be elucidated with reference to a drawing of a number of embodiments. In the drawing.

In all the figures corresponding elements are designated with the same references.

Figure 1:
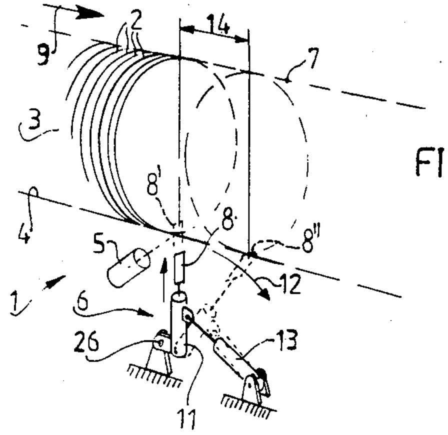
FIG. 1 shows a highly schematic perspective view of a part of a device according to the invention in a first embodiment.
Figure 5:
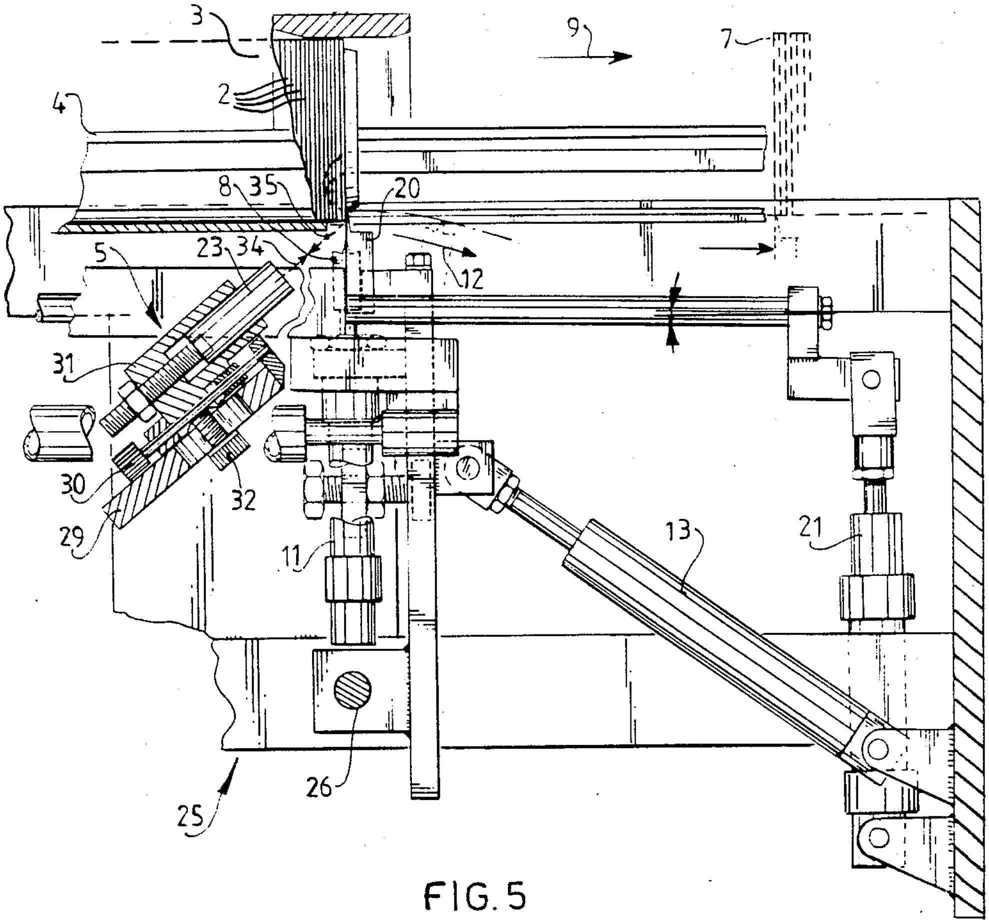
FIG. 5 is a view along V—V in FIG. 4.

FIG. 1 shows a device 1 for forming from a batch 3 consisting of an undetermined number of metal covers 2 of a part batch 7 consisting of a pre-selected number of covers 2, which device comprises: a schematically indicated conveyor chute 4 extending horizontally for supplying the batch 3 and for carrying covers 2 past a counting device 5 for counting the passing covers 2 from the foremost cover of the batch 3, in addition to a separating device 6 for separating off from the batch 3 when a pre-selected number of covers 2 has been reached a part batch 7 shown in FIG. 5 consisting of that counted, pre-selected number of covers 2.

The counting device 5 will be discussed later and is arranged for counting covers 2 one by one.

Separating device 6 comprises a separating member 8 having a separating edge 10 extending transversely of the longitudinal direction, that is, the conveying direction 9, of batch 3, which edge consists in the embodiment to be described hereinafter in more detail of two wedge-shaped separating edge parts. Separating member 8 is carried by a pneumatic cylinder 11 which can be electrically actuated. When it has received an actuating signal, as will be described later, the pneumatic cylinder 11 drives separating edge 10 in radial direction over some distance between two covers 2 in the batch 3, as a result of which separation occurs.

In the embodiment as according to FIG. 1 the pneumatic cylinder 11 is itself mounted for pivoting. It can swivel in the direction of an arrow 12 by corresponding actuation of a pneumatic cylinder 13.

In the actuated state of the pneumatic cylinder 11 the separating member is located in the situation designated with 8′, in which separating edge 10 is located in the batch 3. By actuating cylinder 13 a pivoting movement is performed to the situation designated with 8″. The spacing thus created is indicated with the reference number 14. It is apparent that when actuating cylinder 13 moves separating member 8 from the position 8′ to the position 8″, the separating member 8 moves in the conveying direction 9 at a greater speed than the speed at which the covers are supplied by the conveyor chute 4 in order to produce the spacing 14. It is noted for the sake of completeness that the spacing has as its object, after a pre-selected number of covers has been reached, to combine these covers into a separate part batch 7 which batch 7 can then either be packaged manually or mechanically or processed in another manner. This is however an aspect which in itself bears no relation to the invention and will therefore not be discussed further.

Figure 2:
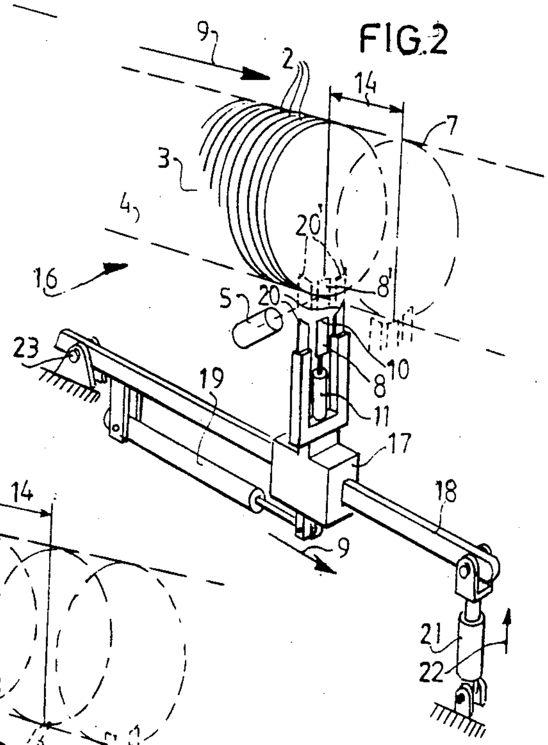
FIG. 2 is a view corresponding with FIG. 1 of a second embodiment.

FIG. 2 shows a device 16 in which the pneumatic cylinder 11 is carried by a carriage 17 which can slide in the direction 9 over a guide rail 18 under the influence of the action of a hydraulic cylinder 19. Carriage 17 bears two transport fingers 20 which serve, after separation has been performed by the separating member 8, for further transport to form the spacing 14 of part batch 7. Transport fingers 20 can for this purpose be placed into the space 14 by actuation of a pneumatic cylinder 21, which makes the rail 18 pivot upward as according to arrow 22 on a pivot member 23. The relevant active position of transport fingers 20 is designated with 20'.

The device 16 operates, in brief outline, as follows. Batch 3 is supplied at a random speed. Counting device 5 counts the covers one by one. When a determined count result has been obtained, actuation of pneumatic cylinder 11 is carried out under the control of a central control unit 24 to be discussed later, as a result of which a separation process is performed. Almost simultaneously the pneumatic cylinder 21 is actuated, whereby the transport fingers 20 move into the position designated with 20'. Pneumatic cylinder 19 is then actuated for further conveyance as according to arrow 9 of the counted off part batch of covers 2 for formation of the spacing 14. It is apparent that when pneumatic cylinder 19 moves carriage 17 and transport fingers 20 in the conveying direction 9, the carriage and transport fingers move in the conveying direction at a grater speed than the speed at which the covers are supplied by the conveyor chute 4 in order to produce the spacing 14. Pneumatic cylinder 21 is subsequently operated such that guide rail 18 returns to its lowest rest position, following by a corresponding actuation of pneumatic cylinder 19 and the device 16 is again ready to process the following counted off part batch of covers 2 in the same way.

Figure 3:
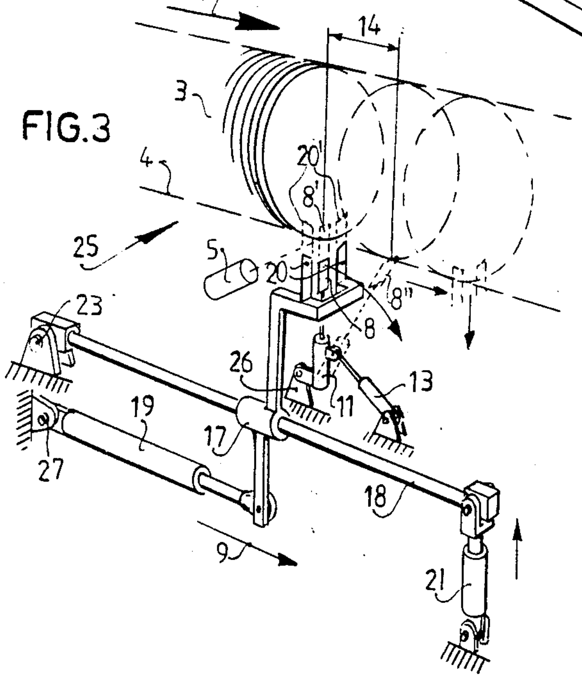
FIG. 3 shows a view corresponding with the previous figures of a third embodiment.

FIG. 3 shows a variant 25 which displays a certain affinity with both the embodiment as according to FIG. 1 and that according to FIG. 2. In this embodiment the pneumatic cylinder 11 is arranged as in FIG. 1 for pivoting by means of a pivot member 26. This corresponds with the device 1 as in FIG. 1. The device 25 further comprises the transport fingers 20 consistent with the device 16 as in FIG. 2. The pneumatic cylinder 19 can in this case pivot on its own pivot member 27.

The operation of device 25 differs from the described operation of device 16 as in FIG. 2 only in that after activation of the transport fingers 20 the pneumatic cylinder 11 is actuated for carrying separating member 8 out of the path of the covers 2.

Figure 4:
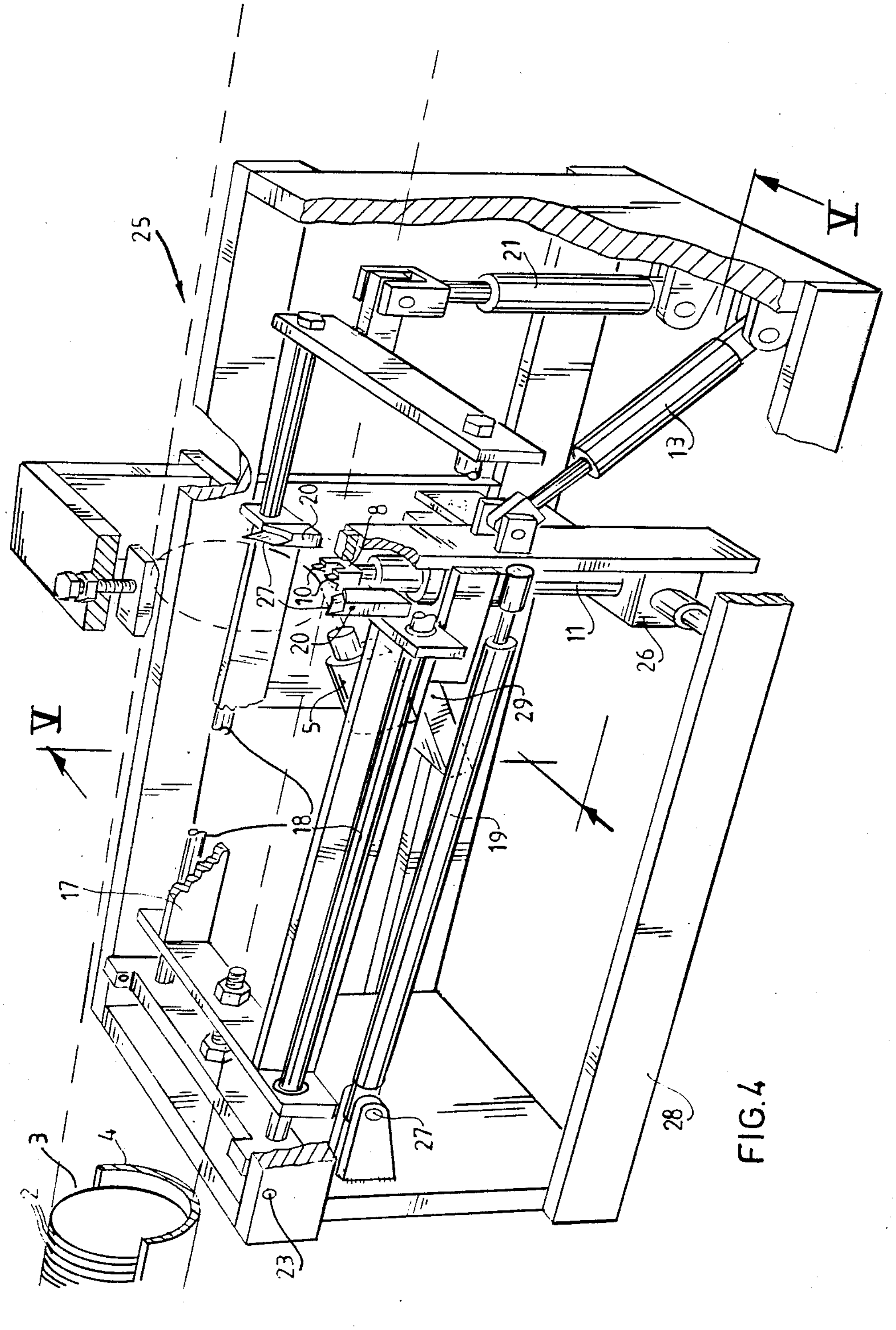
FIG. 4 is a more detailed, partly broken away, perspective view of an important part of the embodiment as according to FIG. 3.

FIG. 4 and 5 show the device 25 in more detail.

The carriage 17 takes the form of a frame which bears transport fingers 20. It can be plainly seen in FIG. 4 that transport fingers 20 are located in the rest position with their upper edges 27 in the same vertical plane as the divided separating edge 10 of separating member 8.

Device 25 further comprises a frame 28 to which the conveyor chute 4 is connected. This frame serves as common attachment member for the various parts.

Counting device 5 is rigidly connected to frame 28 such as to ensure an accurate fixing relative to the passing covers 2.

FIG. 5 shows the construction of the counting device. This is carried by a support member 29 which is firmly connected to frame 28. A carriage 31 can be displaced by means of a screw 30 over support member 29. Carriage 31 can be fixed in a chosen position by means of locking screw 32.

Carriage 31 carries a casing 33 in which are accommodated a source of electromagnetic radiation, focusing means and a detection device for observing reflected radiation. The direction in which the electromagnetic radiation is emitted is indicated by 34, while the radiation reflected by the bottom edge of passing covers is indicated by the numeral 35.

The casing 33 with the source of electromagnetic radiation, the focusing means and the detection device comprise in this case a so-called "Fiber-Sensor", a trademark of the company Dolan-Jenner Industries Inc. The source of electro-magnetic radiation and the detection device is the EFXT 624 model, while type LH 501 is used for the focusing means. The EFXT 624 is a device equipped with two bundles of optical fibres, whereby the one bundle of fibres can be connected for example to a source of ultraviolet radiation which can be directed on the front side via the focusing means onto the covers, while the reflected radiation can be absorbed and conducted further via the second bundle of fibres to an ultra-violet detection device which delivers the count signals to the central control unit.

It is remarked in this respect that the counting device must be arranged and installed such that it can receive reflections from passing covers. The covers used in the present embodiment are of a normal type having an edge that is bent over. An edge that is bent over gives clear reflections in the direction of the source.

The arrangement of the counting device shown in detail in FIG. 5 ensures a very reliable count of the passing covers 2. This arrangement particularly prevents the detection device observing electromagnetic radiation from adjacent covers.

With respect to conveyor chute 4 attention is drawn to the fact that this has a form such that during conveyance the covers are gripped by the chute and friction is caused on both sides of the covers approximately at the level of their central mass. This prevents the first and last covers of a batch from falling over.

Figure 6:
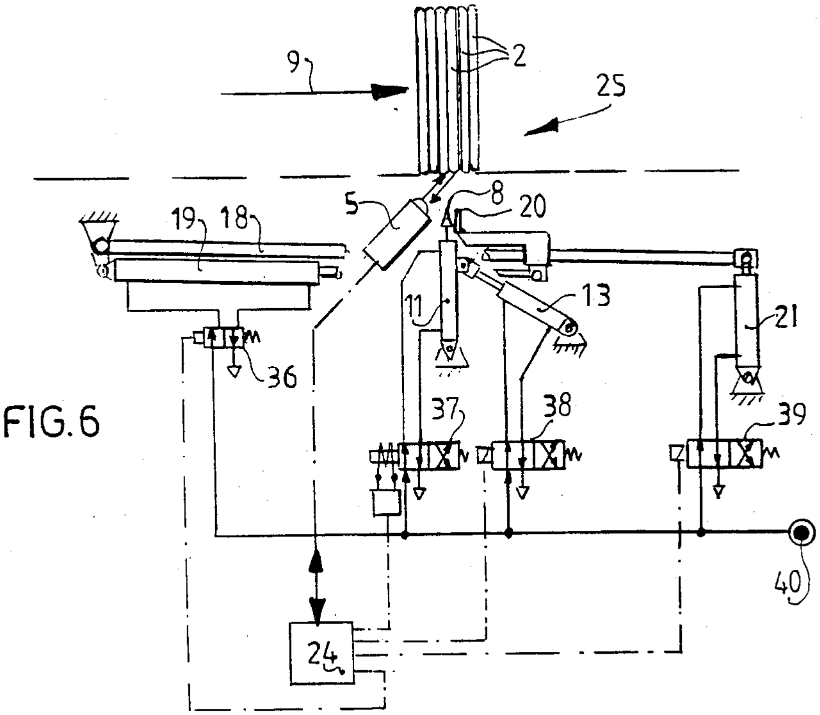
FIG. 6 shows a highly schematic side view of the device as according to the FIGS. 2, 4 and 5 with a block diagram of the control units.

FIG. 6 shows in a highly simplified, partly block diagrammatic view a possible basic construction of the device according to the invention. A central control unit, for example a microprocessor, actuates the source of electromagnetic radiation which is accommodated in the counting device 5.

The output signals of this counting device which correspond to successive passing covers are fed to the central control unit 24. This also comprises a memory, into which has been written a pre-selected number. This number corresponds with the required number of covers in the part batch 7 to be formed. After this count result has been obtained, the diverse pneumatic cylinders are actuated in the sequence already described above. For this purpose appropriate control signals are fed respectively to an actuating unit 36 for the pneumatic cylinder 19, an actuating unit 37 for the pneumatic cylinder 11, and actuating unit 38 for the pneumatic cylinder 13 and an actuating unit 39 for the pneumatic cylinder 21. Power feed takes place from a source 40 for medium under pressure. The actuating unit 37 is driven with a nominal voltage of 24 V. In order to make the duration of engagement of the separating member 8 as short as possible, use is made according to the invention of a voltage in the order of magnitude of 80 V. In this way a sufficiently short duration of engagement of separating member 8 can be effected. The circuits suitable for realization of a voltage of 80 V are known and do not per se form part of the invention. The showing and description of such a circuit will therefore be dispensed with.

Figure 7:
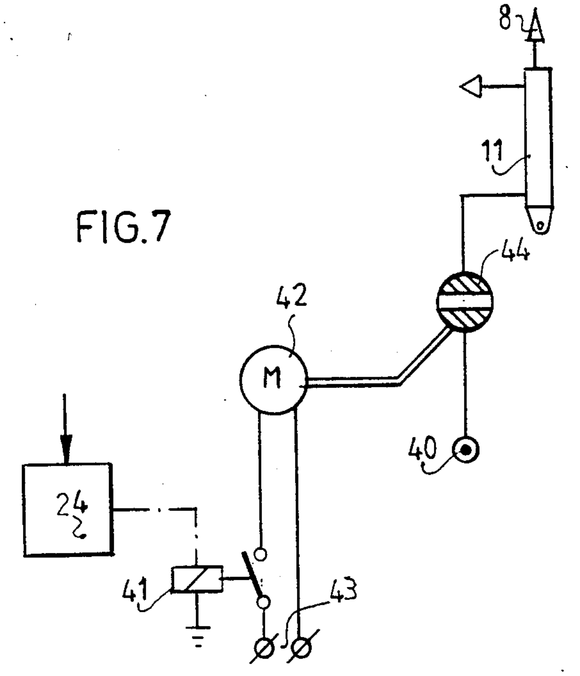
FIG. 7 shows a greatly simplified diagram of an alternative.

Finally, FIG. 7 shows an alternative. In this embodiment the central control unit 24 controls a relay 41 for driving a step motor 42 from a voltage source 43. The step motor 42 is connected to a rotatable valve 44 which can switch connect pneumatic cylinder 11 with pressure source 40.

Attention is drawn to the fact that under discussion in the foregoing is the possibility of arranging and giving the separating member a form such that it can pivot in the conveying direction of the covers for processing. Particular reference is made in this respect to the FIGS. 3, 4, 5 and 6. The separating member can however also be arranged fixed, that is, non-pivoting.

What is claimed:

1. A device for separating a group of a predetermined number of disc-like objects from a supply of an indefinite number of such objects arranged in face-to-face contiguous relation and displacing the group a predetermined distance from the supply, comprising the combination of means for feeding the indefinite number of such objects along a given path past a point of counting and separation, means at said point of counting and separation for counting any chosen number of the objects as they are moved along the path past said point of counting and separation to constitute a particular group thereof, control means for bodily separating the particular group from the supply of the objects and transporting the group in face-to-face contact as a separate unit along said path downstream of the supply, said control means including a separating member aligned with and spaced below said counting and separating point, actuating means for vertically shifting said separating member upwardly into penetrating position between a last-counted object and an adjacent but not count object, means for moving the separating member downstream of the path by said predetermined distance from the counting and separating point, the control means also comprising transport fingers contained in the same vertical plane with the separating member and movable in sequential fashion with respect to the separating member for positioning between the adjacent objects and for moving the group downstream.

2. A device as defined in claim 1 including a carriage upon which the transport fingers are carried, said separating member being pivotally supported for pivotal movement independently of said carriage.

3. A device as defined in claim 2 including second actuating means for pivoting said separating member, said carriage being movable downstream in sequential fashion with respect to pivotal movement of the separating member.

4. A device as defined in claim 1 including a carriage upon which the separating member and the transport fingers are carried, and including second actuating means for moving the carriage downstream.

5. A device for separating a predetermined number of objects from an indefinite number of objects comprising, supply means for supplying at a first speed in a feed direction a plurality of disc-like objects in face-to-face contact with one another, counting means for counting individual objects one by one and providing count signals corresponding to the number of individual counted objects, control means normally spaced from said objects, said control means including a movable portion mounted for movement transversely to said feed direction and also mounted for movement parallel with said feed direction, actuating means for moving said control means to move the movable means transversely to said feed direction to move between a pair of objects to define a predetermined number of objects to be separated and then moving said predetermined number of objects in said feed direction at a second speed greater than said first speed to space said predetermined number of objects downstream of the supply of objects, a control unit including a memory for storage of a preselected count number corresponding to the predetermined number of objects to be separated, said control unit being operatively connected to said counting means for receiving said count signals, and said control unit being operatively connected to said actuating means for causing operation of said actuating means to move said control means to separate said predetermined number of objects when said count signals correspond to the predetermined number stored in said memory.

6. A device as defined in claim 5 wherein said disc-like objects have peripheral edges, said counting means being spaced from said objects and comprising a source of electromagnetic radiation, means for directing said radiation to impinge on individual peripheral edges of said objects, and means for detecting impingement of said radiation on such peripheral edges to count the objects one by one and generate count signals corresponding thereto.

7. A device as defined in claim 5 wherein said movable portion has a wedge shaped edge which moves between a pair of said objects.

8. A device as defined in claim 5 wherein said actuating means is an electrically actuated fluid cylinder.

9. A device as defined in claim 8 wherein the nominal peak value of an actuating signal for the cylinder is a certain value, said cylinder receiving an actuating signal from said control unit which is at least twice as great as said certain value.

10. A device as defined in claim 5 wherein said control means includes a separating member movable transversely with respect to said feed direction and conveying means movable in a direction parallel with said feed direction for conveying said objects at said second speed, said conveying means including a movable carriage supporting a pair of spaced fingers.

11. A device as defined in claim 10 wherein said spaced fingers are disposed on opposite sides of said separating member.

12. A device as defined in claim 10 wherein said separating member is also supported by said carriage.

13. A device as defined in claim 5 including means for frictionally gripping the objects on both sides thereof at approximately the level of their center of mass during transport of the objects in the device.

* * * * *